United States Patent [19]
Ghezzi

[11] Patent Number: 5,129,706
[45] Date of Patent: Jul. 14, 1992

[54] SAFETY DEVICE FOR THE OCCUPIER OF A CAR

[75] Inventor: Lucio Ghezzi, Monza, Italy

[73] Assignee: Alfa Lancia S.p.A., Arese, Italy

[21] Appl. No.: 703,755

[22] Filed: May 21, 1991

Related U.S. Application Data

[63] Continuation-in-part of Ser. No. 465,615, Jan. 19, 1990, abandoned, which is a continuation of Ser. No. 282,493, Dec. 12, 1988, abandoned.

[30] Foreign Application Priority Data

Dec. 24, 1987 [IT] Italy ............................ 22949/87[U]

[51] Int. Cl.$^5$ ............................................. A47C 7/02
[52] U.S. Cl. ................................... 297/452; 297/216; 297/341; 297/458; 297/459
[58] Field of Search ............... 297/452, 487, 464, 458, 297/459, 216

[56] References Cited

U.S. PATENT DOCUMENTS

| | | | |
|---|---|---|---|
| 2,725,921 | 12/1955 | Markin | 297/216 |
| 2,845,998 | 8/1958 | Estabrook | 297/459 |
| 3,695,655 | 10/1972 | Colucci | 297/341 |
| 3,811,726 | 5/1974 | Muraishi et al. | 297/341 |
| 4,065,181 | 12/1977 | Gunlock et al. | 297/452 |
| 4,368,917 | 1/1983 | Urai | 297/459 |
| 4,534,595 | 8/1985 | Abe et al. | 297/452 |
| 4,753,479 | 6/1988 | Hatsutta et al. | 297/458 |

*Primary Examiner*—Laurie K. Cranmer
*Attorney, Agent, or Firm*—Longacre & White

[57] ABSTRACT

A safety device for retaining the lower portion of a body of an occupier of a seat of a car having a padded seat portion and a seat back portion which comprises a rigid belt having a generally "C"-shape and provided with connection members which can be fastened to the padded seat supporting structure. At least a central band portion of the belt is positioned in front of the padding of the padded seat portion, wherein the central band has at least one portion lowered relative to the upper edge of the padded seat portion.

5 Claims, 2 Drawing Sheets

SAFETY DEVICE FOR THE OCCUPIER OF A CAR

CROSS REFERENCE TO RELATED APPLICATIONS

This application is a continuation-in-part of application Ser. No. 465,615 filed Jan. 19, 1990; which in turn is a continuation of Ser. No. 282,493 filed Dec. 12, 1988, both continuation applications now being abandoned.

BRIEF SUMMARY OF THE INVENTION

The present invention relates to a safety device for cars, and, in particular, to a passive fastener means for retaining the lower portion of the body of a person occupying a seat of the car.

Fastener devices for occupiers of the car are generally of two types, i.e., an active type and a passive type.

The first kind of fastener means are enabled in case of sudden deceleration of the car, as in the case of impacts, in order to fasten the occupiers and prevent them from being projected forwards. Devices of this kind are the inflatable air-cushions and the safety belts equipped with inertial winding means.

The fastener devices of passive types are normally provided in a suitable position in order to retain portions of the body of an occupier of the car, like the headrests and the dashboard padding, acting as knee protector means.

Most fastener devices act upon the upper portion of the occupier's body, in order to prevent the head of the occupier of the car from bumping against portions of the car, such as the windshield. Other devices have been developed in the past for protecting the lower portions of the occupier's body, like the knee protectors, which are useful in order to prevent serious injuries in the case of accidents in which the abdomen and the lower limbs of the occupiers of the car are projected forwards, slipping from the surfaces of the car.

These latter devices are used all in order to minimize the consequences of the forward slipping of the occupier's abdomen and of the occupier's lower limbs, and to limit injuries to the occupier's. Their effectiveness can be considerably increased if devices are provided for which are capable of reliably fastening the abdomen and the lower limbs of the occupiers of the seats.

The abdominal safety belts which are known in the prior art, as well as the inflatable air cushions, are not always suitable for their intended purposes, and in some cases they do not succeed in preventing the abdomen and the lower limbs of the occupier of the car from slipping from the seat.

A purpose of the present invention is to provide a safety device, specifically for the abdomen and lower limbs of the occupier of the car, capable of preventing the occupier from slipping from the seat of the car, and consequently slipping forwards in the case of a sudden deceleration of the car.

Another purpose of the present invention is to provide a safety device which does not limit the freedom of movement of the occupiers' legs, during the normal operation of the car, and, above all, which does not hinder the movements which the driver must perform in order to operate the car pedals.

Therefore, a safety device for the occupier of a seat of a car has been provided, which is equipped with a padded seat and with a back, the padded seat being provided with a support structure for the padding, and with the cover, with the support structure being linked to the bodywork of the car by means of saddles, wherein the device is characterized in that it comprises a rigid belt equipped with connection means which can be fastened to the above padded-seat supporting structure. There is provided at least a central band positioned in correspondence of the front wall of the padding of the padded seat, wherein the central band has at least one portion lowered relatively to the upper edge of the padded seat.

According to a preferred solution, the above rigid belt has an overall "C"-shape, and also has two side bands. The central band can be substantially arc-shaped, with it having two lowered portion positioned in correspondence of the side ends of the front wall of the padded seat, and radiused to the above-said side bands.

Still according to a preferred solution, the side bands are positioned in the nearby or approximate location of the lower edges of the side walls of the padded seat, and are provided with a connection means for connection to the padded seat supporting structure.

A belt device according to the present invention succeeds in efficaciously retaining the abdomen, as well as the lower limbs of an occupier of the seat in the event of a sudden deceleration of the vehicle, by frontally retaining the padding of the padded seat. It thus prevents the front portion of the padding from being squeezed by the occupier of the seat under the effect of the sudden deceleration, and therefore prevents the occupier from slipping forwards on the padded seat of which he is occupying.

The solution with the arc-shaped central band is particularly suitable for the driver's seat, because, in correspondence of its lowered portions, it makes it possible for the lower limbs, and in particular the left-hand lower limb, of the driver, to freely sink, when they must be stretched out, in particular to operate the pedal of the clutch, during the normal running condition of the car.

The device according to the present invention constitutes a fitting to the seat, and is endowed with the advantage that it can be fastened to the padded seat supporting structure during the manufacturing step, for example, by welding, or in a subsequent step, for example by riveting. Therefore, it can be mounted as a safety fitting also on a completely finished seat.

Characteristics and advantages of the present invention will now be illustrated by reference to the attached FIGS. 1, 2 and 3, wherein for exemplifying, non-limitative purposes, a preferred form of practical embodiment of the invention is shown.

BRIEF DESCRIPTION OF THE SEPARATE VIEWS OF THE DRAWINGS

DETAILED DESCRIPTION

Figure 1:
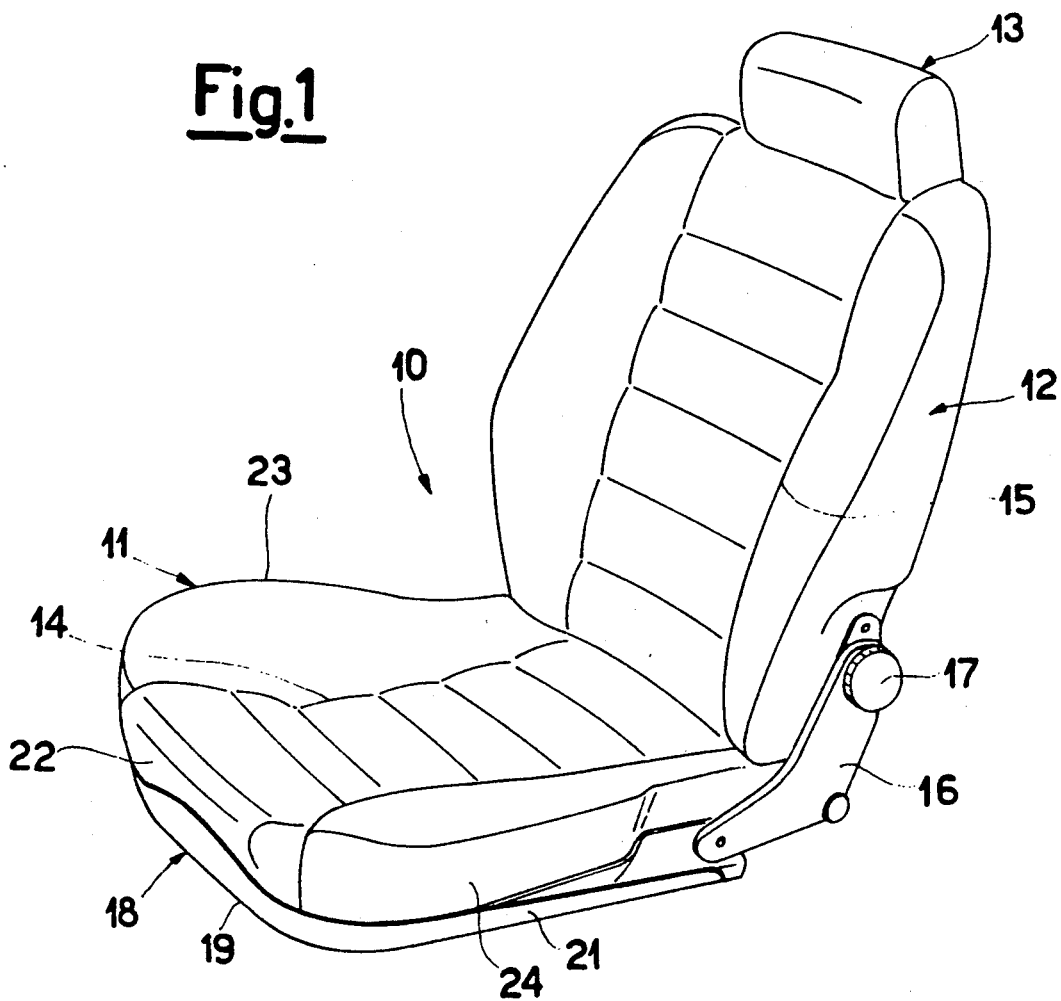
FIG. 1 shows a seat equipped with a safety device according to the present invention.

In FIG. 1, as indicated by reference numeral 10, a front seat of a car is generally indicated, which is formed by a padded seat 11, a seat back 12 and a headrest 13.

The padded seat and the seat back 12 are constituted by support structures and a padding, and are finished by means of covers 14 and 15. The padded seat support structure (S) is only partially shown.

By the reference numerals 16 and 17, the bracket which links the padded seat and the seat back to each other, and the back inclination adjustment knob are respectively indicated.

The safety device, for retaining the abdomen and the lower limbs of the occupier of the seat 10, is constituted by a rigid belt, made of metal sheet, generally indicated by the reference numeral 18. The rigid belt has a "C"-shape, as clearly can be seen in FIG. 2 of the drawings.

The belt 18 is formed by a central band 19 and preferably has two side bands 20 and 21 which surround the padding of the padded seat 11 in correspondence of its front wall 22 and of its side walls 23 and 24 respectively.

The side bands 20 and 21 are provided with brackets 25 which in turn have slots 26, which make it possible for the belt 18 to be fastened to the padded seat supporting structure (S) and to the couple of saddles 27 and 28, which are fastened to the floor of the car, not shown in the Figures.

By the reference numerals 29 and 30, two rubber spacers are indicated, which are interposed between the upper saddles 28 and the brackets 25, and by the reference numerals 31 and 32 the bolts are indicated, which make the same brackets 25 integral with the upper saddles 28.

The central band of the belt 18 is arc-shaped, in order to make is possible for efficacious action of retention of the abdomen and the lower limbs of the occupier of the seat in the event of a sudden deceleration of the car. This prevents them from slipping forwards on the padded seat 11, in that it frontally stiffens the padded seat 11, thus preventing it from being squeezed forwardly.

Therefore, it appears that a safety belt with only dorsal branches can be used.

The lowered end portions of the band 19, which are smoothly radiused with the side bands 20 and 21, enable the lower limbs of the occupier of the car, and in particular the left-hand lower limb of the occupier of the car is freely lower when they must be stretched out. This is normally necessary in order to operate the pedal of the clutch during the normal running of the car.

Figure 3:
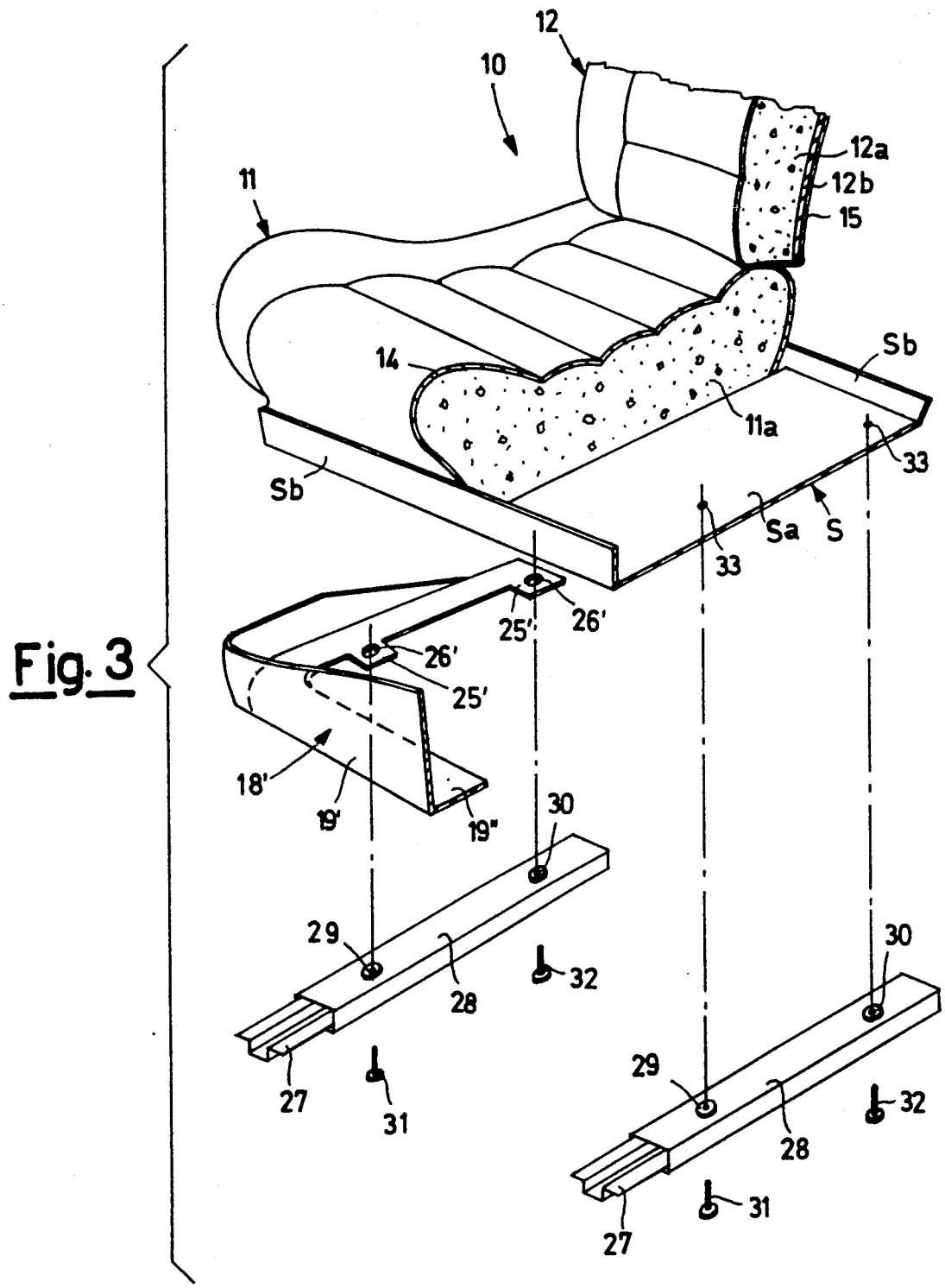
FIG. 3 shows a cross-section through the seat with the rigid belt of this invention shown in relationship to the seat.

Referring to FIG. 3, the padded seat portion 11 includes a padded padding 11a and a covering 14 which is secured to a base support structure (S) defining a rigid support for the padded seat portion 11. The support structure is advantageously formed by a rigid sheet metal having a plate portion Sa and peripheral borders Sb encircling the padded seat portion at the lower portion thereof. The support structure S may obviously be constructed in a different manner provided that it is rigid enough to support the padded portions 11 and 12.

The padded back portion 12 has a substantially equivalent construction containing a padding 12a and a covering 15, and is made rigid with a rigid support structure 12b, which is linked to the base support structure S by the brackets 16.

The base support structure S has means for connection to the car. The means comprises holes 33 wherein self-tapping screws 31 and 32 are screwed which rigidly connect the base support structure S with saddles 28 slidable on saddles 27, which later are fastened to the floor of the car by means not shown in the drawings. In this way, the base support structure S is connected to the car with the possibility of adjustment in the lengthwise direction of the car.

The rigid belt 18 is fastened to the base support structure S by the brackets 25 provided with slots 26 through which the same screws 31 and 32 pass. The also fasten the belt 18 between the base support structure S and the saddles 28 so that the belt 18 is made rigid with the seat 10.

Figure 2:
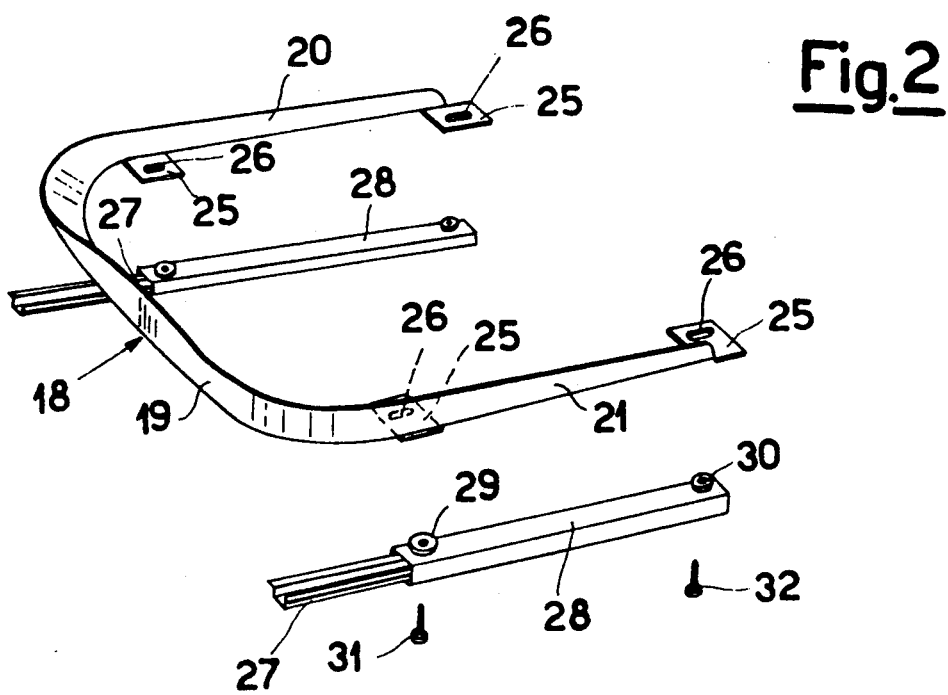
FIG. 2 shows the same safety device separated from the seat of FIG. 1.

In the embodiment shown in FIG. 3, the rigid belt 18' has a front wall 19' and side bands corresponding to the side bands 20 and 21 of the embodiment set forth in FIGS. 1 and 2, as well as an inwardly projecting flat base portion 19" extending along the side bands and the front wall of the belt 18'. From the portion 19" there projects brackets 25' which have slots 26' equivalent to the brackets 25 and slots 26 of those of FIGS. 1 and 2.

From the discussion above, it can be clearly apparent that the base support structure and the rigid belt are distinct members, and that the belt is fastened to the base support structure but operates on the padded seat portion, specifically on the front wall thereof, to maintain the same in a substantially stable position over the base support structure when the padded seat portion is compressed at the front wall by the occupier of the car. This normally occurs during a sudden deceleration of the car.

In the examples shown above, it is clear that the belt 18 is placed outside the cover 14 of the padded seat 11, but it is also possible to hide the belt inside the same cover. The belt 18 as indicated above also could be constituted by only the central band 19 which is provided with suitable connection means for it to be fastened to the padded seat supporting structure S.

I claim:

1. A safety device for the occupier of a car for retaining the lower portion of the body of the occupier securely in a seat of the car, the car being equipped with a padded seat cushion portion and with a seat back, the padded seat cushion portion being provided with a support structure for the padding, and with a finishing cover, said support structure being linked to body work of the car by means of saddles, said safety device comprising:
    a rigid belt member having connecting means which can be fastened to said supporting structure, said rigid belt having a central band portion position in close correspondence along the breadth and height of a wall of the padding of the padded seat cushion portion, and said central band having at least one portion along said wall lowered relative to an upper edge of said padded seat cushion portion along said wall, so that deformation of said wall in a direction transverse to said central band portion by an occupier of said car is substantially prevented.

2. A safety device for retaining the lower portion of the body of the occupier in the seat of a car, the seat having a base support structure, a padded seat portion and a padded back portion, both fastened to said base support structure, said base support structure having means for connection to the car, the device comprising a rigid belt fastened to said base support structure, said rigid belt being positioned adjacent at least a front wall portion of said base support structure and a front wall of said padded seat portion externally thereof and having a height projected along said front wall of said padded seat portion externally thereof to engage and hold said front wall of said padded seat portion in a substantially stable position over said base support structure when said padded seat portion is compressed at said front wall by the occupier owing to a sudden deceleration of the car, said rigid belt having a central portion in close correspondence with said front wall.

3. The safety device according to claim 2, wherein said central portion is substantially arc-shaped and has two lowered portions each positioned at side ends of front wall of said padded seat portion.

4. The safety device according to claim 2, wherein said rigid belt has a generally "C"-shape and also includes two side portions extending from opposite ends of said central portion wherein said side portions are positioned adjacent lower edges of side walls of said padded seat portion and each side portion comprises means for connection to said base support structure.

5. A safety device for retaining the lower portion of the body of the occupier in the seat of a car, the seat having a base support structure, a padded seat portion and a padded back portion, both fastened to said base support structure, said base support structure having means for connection to the car, the device comprising a rigid belt fastened to said base support structure, said rigid belt being positioned adjacent at least a front wall of said padded seat portion externally thereof and having a height projecting at said front wall along said padded seat portion externally thereof to engage and hold said front wall of said padded seat portion in a substantially stable position over said base support structure when said padded seat portion is compressed at said front wall by the occupier owing to a sudden deceleration of the car, said rigid belt having a central portion positioned at said front wall and having a profile including at least one portion lowered relative to an upper edge of said front wall of said padded seat portion to allow for ordinary occupier movement while seated in said car.

* * * * *